US012636651B2

(12) United States Patent
Triva

(10) Patent No.: US 12,636,651 B2
(45) **Date of Patent: *May 26, 2026**

(54) CONTAINER FOR SELECTIVE TRANSFER OF SAMPLES OF BIOLOGICAL MATERIAL

(71) Applicant: Copan Italia S.p.A., Brescia (IT)

(72) Inventor: Daniele Triva, Brescia (IT)

(73) Assignee: Copan Italia S.p.A., Brescia (IT)

( * ) Notice: Subject to any disclaimer, the term of this patent is extended or adjusted under 35 U.S.C. 154(b) by 1092 days.

This patent is subject to a terminal disclaimer.

(21) Appl. No.: 17/653,076

(22) Filed: Mar. 1, 2022

(65) Prior Publication Data

US 2022/0176379 A1 Jun. 9, 2022

Related U.S. Application Data

(63) Continuation of application No. 16/137,320, filed on Sep. 20, 2018, now Pat. No. 11,292,005, which is a (Continued)

(30) Foreign Application Priority Data

Nov. 19, 2010 (IT) .......................... MI2010A002141

(51) Int. Cl.
*B01L 3/00* (2006.01)

(52) U.S. Cl.
CPC ............... *B01L 3/56* (2013.01); *B01L 3/5021* (2013.01); *B01L 3/5029* (2013.01); (Continued)

(58) Field of Classification Search
CPC ........................................................ B01L 3/56
(Continued)

(56) References Cited

U.S. PATENT DOCUMENTS 4,683,058 A 7/1987 Lyman et al.
4,769,145 A 9/1988 Nakajima
(Continued)

FOREIGN PATENT DOCUMENTS

CN 2803509 7/2004
DE 529784 7/1931
(Continued)

OTHER PUBLICATIONS

AU Examination Report issued in Australian Application No. 2011330816, dated Aug. 19, 2014, 3 pages.
(Continued)

*Primary Examiner* — Lyle Alexander
*Assistant Examiner* — Emily R. Berkeley
(74) *Attorney, Agent, or Firm* — Fish & Richardson P.C.

(57) ABSTRACT

A container for selective transport of samples of biological material or of biological origin suitable for containing at least a fluid or liquid and/or for containing at least a portion of a collecting device, the container having a selective passage portion configured to prevent exit of a fluid or liquid from the container, through the passage portion, at least in at least an operating sealed condition defined at least by a rest state of the container or by a first value of mechanical shaking of the container and/or by a first value of relative centrifugal force to which the container is subjected, and configured selectively to enable exit of the fluid or liquid from the container, across the passage portion, at least in an operating passage condition, defined at least by a corresponding second state of mechanical shaking of the container and/or wherein the container is subjected to a corresponding second relative centrifugal force.

13 Claims, 7 Drawing Sheets

Related U.S. Application Data continuation of application No. 13/885,150, filed as application No. PCT/IB2011/055161 on Nov. 17, 2011, now Pat. No. 10,105,707.

(52) U.S. Cl.
CPC . *B01L 2300/046* (2013.01); *B01L 2300/0609* (2013.01); *B01L 2300/0681* (2013.01); *B01L 2300/0851* (2013.01); *B01L 2400/0688* (2013.01); *Y10T 436/25* (2015.01)

(58) Field of Classification Search
USPC .......................................................... 436/174
See application file for complete search history.

(56) References Cited

U.S. PATENT DOCUMENTS

| | | | |
|---|---|---|---|
| 6,719,896 B1 | 4/2004 | Clark | |
| 7,658,982 B2 | 2/2010 | Schwarzwald | |
| 10,105,707 B2 | 10/2018 | Triva | |
| 11,292,005 B2 * | 4/2022 | Triva | B01L 3/5021 |
| 2003/0038076 A1 | 2/2003 | Schwarzwald | |
| 2005/0208548 A1 | 9/2005 | Block | |
| 2011/0146418 A1 | 6/2011 | Brevnov et al. | |
| 2013/0105393 A1 | 5/2013 | Hiesinger et al. | |
| 2013/0196841 A1 | 8/2013 | Dobrowolski | |

FOREIGN PATENT DOCUMENTS

| | | |
|---|---|---|
| EP | 1144094 | 10/2001 |
| JP | 5867339 | 4/1983 |
| JP | 5919832 | 2/1984 |
| JP | 62221459 | 9/1987 |
| JP | 2001318091 | 11/2001 |
| JP | 2008139106 | 6/2008 |
| WO | 2012016720 | 2/2012 |

OTHER PUBLICATIONS

CN Office Action issued in Chinese Application No. 201180055755.6, dated Apr. 10, 2015, 9 pages (With English Translation).
CN Office Action issued in Chinese Application No. 201180055755.6, dated Sep. 1, 2014, 17 pages (With English Translation).
JP Office Action issued in Japanese Application No. 2013-539387, dated Jul. 14, 2014, 5 pages (With English Translation).
PCT International Search Report and Written Opinion In International Appln. No. PCT/IB2011/055161, dated Mar. 14, 2012, 11 pages.
RU Office Action issued in Russian Application No. 2013126950/05, dated Oct. 30, 2015, 7 pages (With English Translation).

* cited by examiner

CONTAINER FOR SELECTIVE TRANSFER OF SAMPLES OF BIOLOGICAL MATERIAL

CROSS-REFERENCE TO RELATED APPLICATIONS

This application is a continuation of and claims the benefit of priority to U.S. application Ser. No. 16/137,320, filed on Sep. 20, 2018, which is a continuation of U.S. application Ser. No. 13/885,150, now issued as U.S. Pat. No. 10,105,707 on Oct. 23, 2018, which is a U.S. National Phase application of International Application No. PCT/IB2011/055161, filed on Nov. 17, 2011, which claims priority to Italian Application No. MI2010A002141, filed on Nov. 19, 2010, the contents of which are hereby incorporated by reference.

The present invention relates to a container for selective transfer of samples of biological material, or material of biological origin. The invention is applicable for example to containers for use with laboratory test tubes or test tubes for laboratory centrifuges, and in particular for containers or baskets that are removably insertable in the test tubes such as to enable a selective and controlled passage of a fluid or liquid from the container to the test tube. For collecting samples of biological material or materials of biological origin, the use of collecting devices is known, for example comprising a flocked tampon, made by flocking a plurality of fibres on a portion of the body of the device, or tampons of a type comprising a hydrophilous fibre wound about a portion of the body. These collecting devices of known type are for example used in the forensic sector, such as to enable collection of samples of biological material or material of biological origin (for example cells having DNA to be analysed) from a place of collection (for example a crime scene) and transfer of the samples towards a place or laboratory in which an analysis of the samples can be made. The collection is usually done by elution of the surface on which the sample to be collected is present, for example samples of cells belonging to a subject to be identified, and by subsequent collection, by means of the collecting device or tampon, of the thus-collected sample. The tampon is then inserted for transport internally of a test tube which is closed with a lid and which is then transported towards an analysis laboratory. Also known is that the sample of biological material thus collected, for example DNA or RNA, can then be extracted from the collecting device such as to enable conservation over time and/or to enable successive performing of examinations or analyses of various types on the collected biological sample.

For extraction of the biological sample from the collecting device, in the prior art a portion of the collecting device is inserted, that can be separated from the remaining part of the rod of the collecting device, in a laboratory and a centrifuge test tube, in which a fluid or liquid are also introduced, in a quantity for example of about 0.4-0.6 ml, comprising for example a lysing agent. The test tube can be of a type conventionally known in the sector as Eppendorf®, from the name of a production company of this type of test tube. The test tube is closed and maintained at ambient temperature, or subjected to a heat incubation treatment, at predetermined temperatures and for predetermined times (for example in the order of 50-70° C. or beyond, for a time, for example, of between 1 and 8 hours), also in order to facilitate the detachment of the biological material from the portion of the collecting device. During the incubating stage, the test tube can be subjected to shaking of a determined entity such as to facilitate the process of separation of the biological material from the collecting device and collection thereof in the fluid or liquid, for example by means of a laboratory vibrator shaker of a vortex type provided with an orbital cup. At this point the portion of collecting device is extracted from the test tube by sterile or sanitised pliers, and inserted in a container or basket having a grid or perforated bottom which is then inserted in the test tube in a position that is distanced from the bottom of the test tube.

The test tube is then closed and subjected to shaking in a laboratory centrifuge, for example at about 8000 rpm for about a minute, generating an acceleration or relative centrifugal force (commonly denoted by RCF) suitable and suitable for enabling detachment of a remaining part of the biological material and lysing fluid or liquid still present on the portion of collecting device, with a consequent passage of the biological material and the lysing fluid or liquid through the openings on the bottom of the basket up to be collected in the test tube. At this point the basket and the portion of the collecting device can be removed from the test tube which can be re-closed, with the initially-collected biological material from the collecting device still internal thereof.

The solutions in the prior art described above exhibit some drawbacks, which will now be described.

Note that the above-described process is very laborious, and involves a series of very delicate steps which must be performed with a considerably degree of precision, leading to a concrete risk of human errors.

Further, the need to move the portion of collecting device several times in order to enable almost complete extraction of the biological material collected inevitably leads to a risk of loss or contamination of the biological sample. Note that very often the biological samples are in very small quantities and it is not possible to obtain others should they be contaminated; it is thus of the greatest importance to collect all the biological material collected by the collecting device, while at the same time most emphatically preventing any contamination thereof. For example, in the forensic sector, and therefore in the case of DNA samples collected for investigative reasons, it is possible that the only sample available in the place of origin is the same collected by the collecting device, and it is therefore fundamental to have correct conservation thereof. Further, in this case a possible contamination of the sample can lead to errors in the analysis thereof, with potentially very grave consequences.

In this situation, an aim of the present invention is to make available a container for selective transfer of samples of biological material or material of biological origin which enables obviating one or more of the above-cited drawbacks.

A further aim of the present invention is to realise a container for selective transfer of samples of biological material or materials of biological origin which enables a reduction in the risk of contamination of the biological sample treated.

A further aim of the present invention is to provide a container for selective transfer of samples of biological material or materials of biological origin which enables simplifying the extraction operation of the biological sample from the collecting device and/or reducing the time required for performing this operation.

A further aim of the present invention is to make available a container for selective transfer of samples of biological or material of biological origin which enables recuperating, before the analysis, substantially all the sample collected by the collecting device.

A further aim of the present invention is to provide a container for selective transfer of samples of biological or material of biological origin which is simple and economical to realise and/or easy and convenient to use.

These aims and more besides, which will more fully emerge from the following description, are substantially attained by a container for selective transfer of samples of biological material or material of biological origin according to the contents of one or more of the following claims, taken singly or in combination, or in combination with any one of the further aspects or characteristics described herein below, taken alone or in any combination.

The invention further relates to a container according to one or more of the accompanying claims, alone or in combination with one another or with any one of the further aspects indicated herein, wherein a containing wall comprises at least a bottom wall 7 substantially opposite an access opening to the compartment and comprises a selective passage portion and wherein it further comprises at least a lateral wall extending from the bottom wall 7 such as to define the compartment.

The invention further relates to a container according to one or more of the attached container claims, alone or in combination with one another or with any one of the further aspects indicated herein, wherein at least one of the operating passage conditions is further characterised by the presence of a portion of a collecting device in the container.

The invention further relates to a container according to one or more of the attached container claims, alone or in combination with one another or with any one of the further aspects indicated herein, wherein a selective passage portion is configured such as to prevent exit of a fluid or liquid from the container via the selective passage portion at least in an operative sealed condition in which the container is mechanically shaken at an angular velocity of less than 1000 rpm (revolutions per minute), or than 2500 rpm, or than 4000 rpm or than 5000 rpm, in a laboratory centrifuge for a first predetermined time interval of shaking and/or in which the selective passage portion is configured such as to selectively enable exit of the fluid or liquid from the container through the selective passage portion in an operating passage condition in which the container is mechanically shaken at an angular velocity of at least 1000 rpm, or 2500 rpm, or 5000 rpm, or 6000 rpm, or 7000 rpm or 8000 rpm or 10.000 rpm, in a laboratory centrifuge, for a second predetermined time interval of shaking.

The invention further relates to a container according to one or more of the attached container claims, alone or in combination with one another or with any one of the further aspects indicated herein, wherein the body is made of a plastic material, for example polypropylene or virgin polypropylene, and/or by means of plastic material injection and/or wherein the weakened portions and/or the openings are realised on the body by injection.

The invention further relates to a container according to one or more of the attached container claims, alone or in combination with one another or with any one of the further aspects indicated herein, wherein the body further comprises a profiled rest portion which cooperates with a corresponding support portion of the test tube such as to maintain the container in the test tube in a predetermined position, raised and distanced from the bottom of the test tube and/or wherein the container is configured such as to be couplable with a laboratory test tube such as to enable transfer into the test tube of a fluid or liquid contained in the container by means of mechanical shaking of the test tube in one of the operating passage conditions for the second predetermined time interval.

The invention further relates to a container according to one or more of the attached container claims, alone or in combination with one another or with any one of the further aspects indicated herein, wherein the selective passage portion exhibits a surface extension of less than 1 $cm^2$ or less than 0.8 $cm^2$, or less than 0.5 $cm^2$ and/or wherein all the dimensions of the body are less than about 5 cm, or than 4 cm, or than 3 cm or than 2.5 cm.

The invention further relates to a container according to one or more of the attached container claims, alone or in combination with one another or with any one of the further aspects indicated herein, wherein the selective passage portion is configured such as to enable passage of at least 80%, or at least 85% or at least 90% or at least 95% of the fluid or liquid contained in the compartment when the container is subjected to one of the operating passage conditions for a second time interval of shaking of at least 20 seconds, or at least 40 seconds, or at least 1 minute, or at least 2 minutes.

The invention further relates to a container according to one or more of the attached container claims, alone or in combination with one another or with any one of the further aspects indicated herein, characterised in that it has a capacity comprised between 0.1 ml and 4 ml, or between 0.2 ml and 3 ml, or between 0.3 ml and 2 ml, or between 0.5 ml and 1.5 ml.

The invention further relates to a container according to one or more of the attached container claims, alone or in combination with one another or with any one of the further aspects indicated herein, wherein the test tube is a laboratory and/or a centrifuge test tube having a capacity comprised between 0.250 ml and 5 ml, or between 0.5 ml and 3 ml, or between 1 ml and 2 ml.

The invention further relates to a process according to one or more of the attached container claims, alone or in combination with one another or with any one of the further aspects indicated herein, further comprising steps of: inserting a portion of a collecting device for biological samples in the container; inserting a lysing fluid or liquid in the container; and subjecting the container comprising the portion of a collecting device and the lysing fluid or liquid to heat incubation, at a predetermined temperature and for a predetermined incubation time, before the step of inserting the container in the test tube.

The invention further relates to a process according to one or more of the attached container claims, alone or in combination with one another or with any one of the further aspects indicated herein, further comprising a step of removing the container from the test tube after the step of mechanically shaking the test tube containing the container.

The invention further relates to a process according to one or more of the attached container claims, alone or in combination with one another or with any one of the further aspects indicated herein, wherein the step of mechanically shaking the test tube containing the container, or subjecting the test tube to a relative centrifugal force, is performed causing passage of at least 80%, or at least 85%, or at least 90% or at least 95% of the fluid or liquid from the container to the test tube.

There now follows, by way of non-limiting example, a detailed description of some preferred embodiments of a container according to the invention, in which.

Figure 1:
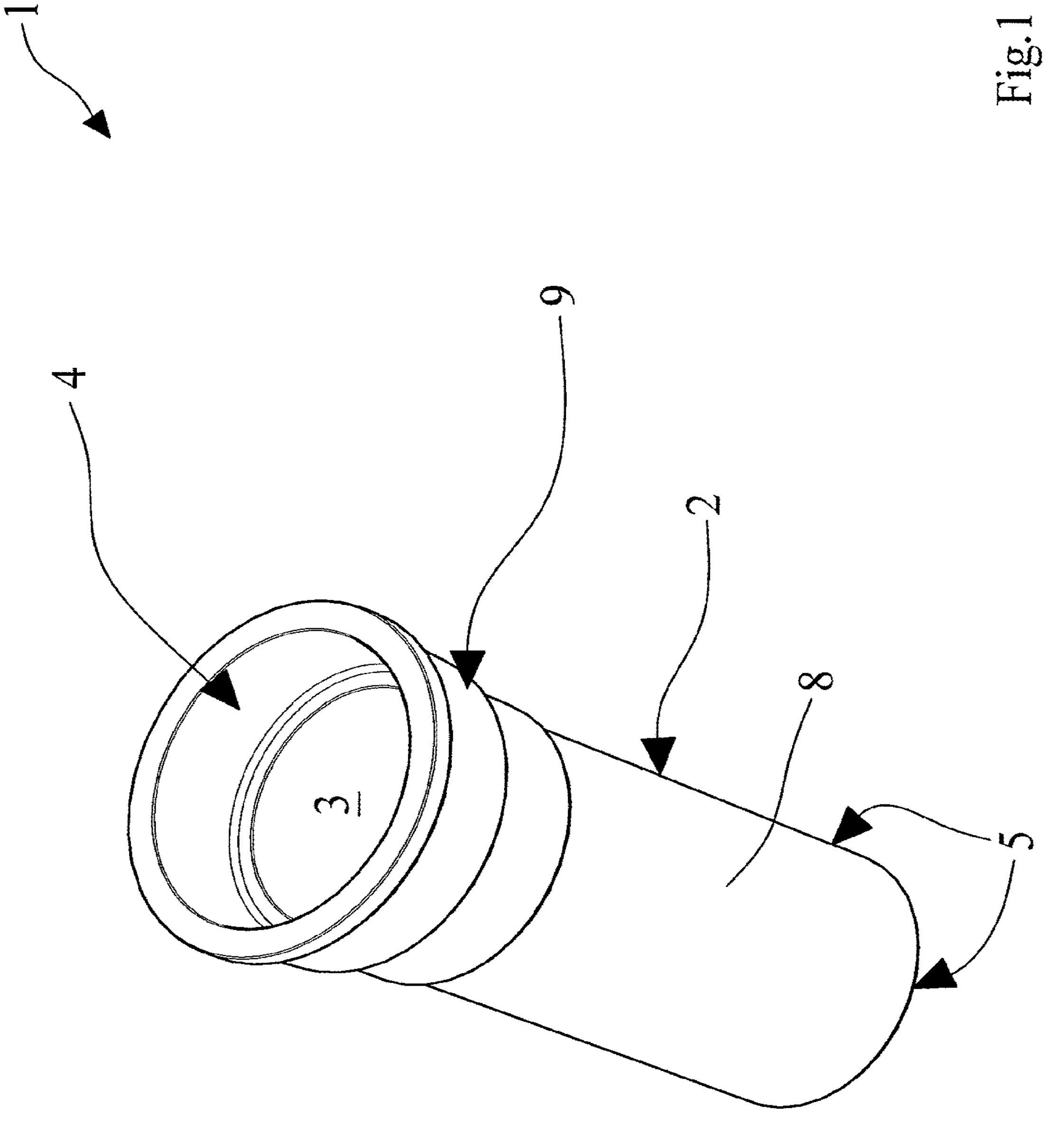
FIG. 1 is a first perspective view of a container of an embodiment of the present invention.

The figures illustrate, by way of non-limiting example, an embodiment of the invention configured for transferring samples of biological material or material of biological origin, but the invention can also be applicable for different uses to the illustrated ones. In the present description, by biological material or material of biological origin, various materials are intended, both biological and of biological origin, among which also samples of tissues from living beings, for example cells comprising DNA.

With reference to the accompanying figures, 1 denotes in its entirety a container for selective transfer of samples of biological material or material of biological origin comprising a body 2 having at least a compartment 3 suitable for containing at least a fluid or liquid and/or for containing at least a portion 16*a* of a collecting device 16 for biological samples. The container 1 can be for example a basket for selective transfer of samples of biological material or material of biological origin. The body 2 comprises at least an access opening 4 to the chamber 3 and at least a containing wall 5 provided with at least a selective passage portion 6.

Figure 2:
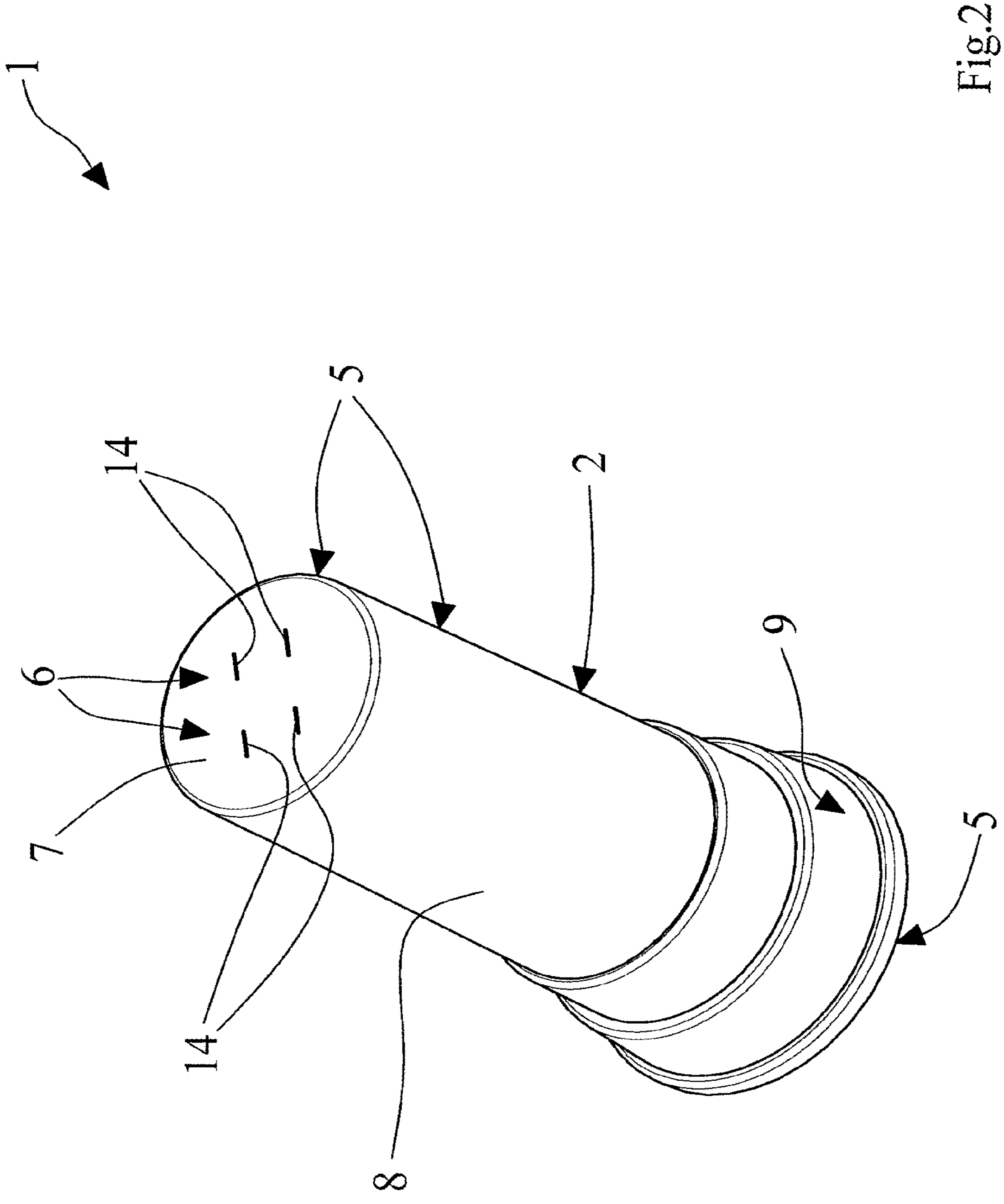
FIG. 2 is a second perspective view of the container of FIG. 1 from a second position.

As can be seen in FIG. 1 or 2, the containing wall 5 comprises at least a bottom wall 7 substantially opposite the access opening 4 to the compartment 3 and comprising the selective passage portion 6. The containing wall 5 further comprises at least a lateral wall 8 extending from the bottom wall 7 such as to define the compartment 3. The selective passage portion 6 or the bottom wall 7 can exhibit a surface extension of less than 1 $cm^2$ or less than 0.8 $cm^2$, or less than 0.5 $cm^2$. The body 2 can exhibit all dimensions of less than about 5 cm, or a 4 cm, or about 3 cm or about 2.5 cm. The container 1 can have a capacity comprised between 0.1 ml and 4 ml, or between 0.2 ml and 3 ml, or between 0.3 ml and 2 ml, or between 0.5 ml and 1.5 ml.

The selective passage portion 6 is configured such as to prevent exit of the fluid or liquid from the container 1, through the passage portion 6, at least in at least a sealed operative condition characterised at least by a state of repose of the container 1 or by a first value of mechanical shaking of the container 1 and/or by a first value of relative centrifugal force to which the container 1 is subjected. The selective passage portion 6 can be configured such as to prevent exit of the fluid or liquid from the container 1 at a plurality of these sealed operative conditions, characterised at least by a plurality of respective first mechanical shaking values of the container 1 that are less than a predetermined stage of mechanical shaking of the container 1, and/or characterised at least by a plurality of respective first values of centrifugal force that are less than a predetermined relative centrifugal force, the sealed operating conditions being applied for a predetermined first time interval. For example, the selective passage portion 6 can be configured such as to prevent exit of the fluid or liquid from the container 1 through the selective passage portion 6 at least in a sealed operative configuration in which the container 1 is subjected to a relative centrifugal acceleration or a relative centrifugal force (RCF) that is less than 500×g, less than 1000×g, or less than 2000×g, or less than 3000×g, or less than 4000×g, or less than 5000×g, for a predetermined first shaking time interval.

The above-indicated relative centrifugal forces can correspond for example for some common laboratory centrifuges, to an angular velocity of less than 500 rpm (revolutions per minute), or less than 1000 rpm, or less than 2500 rpm, or less than 4000 rpm or less than 5000 rpm. The selective passage portion 6 is further configured such as selectively to enable exit of the fluid or liquid from the container 1, through the passage portion 6, at least in an operative passage condition, characterised at least by a corresponding second state of mechanical shaking of the container 1 and/or in which the container 1 is subjected to a corresponding second relative centrifugal force. The selective passage portion 6 can be configured such as to selectively enable exit of the fluid or liquid from the container 1, through the passage portion 6, in a plurality of the operative passage conditions, characterised at least by a plurality of second respective values of mechanical shaking of the container 1 that are greater than the predetermined state of mechanical shaking of the container 1 and/or characterised at least by a plurality of respective second values of centrifugal force superior to the value of relative centrifugal force greater than the predetermined value of relative centrifugal force, applied for a second predetermined time interval.

For example the selective passage portion 6 can be configured such as to selectively enable exit of the fluid or liquid from the container 1 through the selective passage portion 6 in an operative passage condition in which the container 1 is subjected to a relative centrifugal acceleration or relative central force (RCF) of at least 500×g, or at least 1000×g, or at least 2500×g, or at least 5000×g, or at least 7500×g, or at least 10000×g for a second predetermined interval of shaking time. The above-cited relative centrifugal forces can correspond, for example, for some centrifuges, at an angular velocity of at least 5000 rpm, or 6000 rpm, or 7000 rpm or 8000 rpm or 10000 rpm. These values can be valid for example for a centrifuge having a rotor radius in the order of 5 cm. The selective passage portion 6 can be configured such as to enable the passage of at least 80%, or at least 85%, or at least 90% or at least 95% of the fluid or liquid contained in the compartment 3 when the container 1 is subjected to one of the operative passage conditions for a second time interval of shaking of at least 20 seconds, or at least 40 seconds, or at least 1 minute, or at least 2 minutes.

The duration of the first time interval, in which there is no passage of fluid or liquid through the selective passage portion 6, also in conditions of mechanical shaking or the container 1, depends on the entity of the mechanical shaking itself. According to the values of mechanical shaking, it can be for example less than 5 minutes, or less than 2 minutes, or less than 1 minute, or less than 30 minutes, or less than 10 minutes. Also the duration of the second time interval, at which the passage of fluid or liquid through the selective passage portion 6 depends on the entity of the mechanical shaking, and can be for example of at least 10 seconds, or at least 20 seconds, or at least 40 seconds, or at least 1 minute, or at least 2 minutes, or at least 5 minutes, according to the relative centrifugal force RCF applied.

The permeability of the selective passage portion 6 can further increase on increasing the temperature, also in relation to the material the container 1 is made of, and therefore corresponding to an increase in temperature there can be a reduction of the relative centrifugal force necessary to cause the fluid or liquid passage through the selective passage portion 6. The above-cited values relate to a container 2 at ambient temperature. The mechanical shaking of the container 1 and/or the test tubes can be for example done by means of a common laboratory centrifuge. The centrifuge is not illustrated as it is of known type. Centrifuges are widely used instruments in scientific laboratories, for example such as to separate particles in solution, by means of application of an artificial centrifugal force obtained with a high-speed rotating system. The sedimentation force artificially developed by the centrifuge is commonly called Relative Centrifugal Force, although it would be more properly known as acceleration, and is indicated by a number representing a multiple of the force, or rather acceleration, of the Earth's gravity, denoted by "×g". Centrifuges are distinguished on the basis of the maximum RCF that can be reached, which essentially depends on the angular rotation velocity reached by the rotor of the centrifuge, i.e. the distance between the centre of rotation and the position in which the test tube containing the substance to be centrifuged is at. The relation between the RCF, the rotations per minute developed by the centrifuge and the radius of the rotor (r) is described by the following equation:

$$RCF\ (g)=(rpm/1000)^2*11{,}18*r$$

The following is an example of a conversion table from which it is possible to deduce, for each rotor and rapidly and directly, the conversion between rpm and RCF.

Conversion Table

| Speed | Rotor Radius (from center of rotor to sample) in centimeters | | | | | | | | | | | |
|---|---|---|---|---|---|---|---|---|---|---|---|---|
| (RPM) | 4 | 5 | 6 | 7 | 8 | 9 | 10 | 11 | 12 | 13 | 14 | 15 |
| 1000 | 45 | 56 | 67 | 78 | 89 | 101 | 112 | 123 | 134 | 145 | 157 | 168 |
| 1500 | 101 | 126 | 151 | 176 | 201 | 226 | 252 | 277 | 302 | 327 | 352 | 377 |
| 2000 | 179 | 224 | 268 | 313 | 358 | 402 | 447 | 492 | 537 | 581 | 626 | 671 |
| 2500 | 280 | 349 | 419 | 489 | 559 | 629 | 699 | 769 | 839 | 908 | 978 | 1048 |
| 3000 | 402 | 503 | 604 | 704 | 805 | 906 | 1006 | 1107 | 1207 | 1308 | 1409 | 1509 |
| 3500 | 548 | 685 | 822 | 959 | 1096 | 1233 | 1370 | 1507 | 1643 | 1780 | 1917 | 2054 |
| 4000 | 716 | 894 | 1073 | 1252 | 1431 | 1610 | 1789 | 1968 | 2147 | 2325 | 2504 | 2683 |
| 4500 | 906 | 1132 | 1358 | 1585 | 1811 | 2038 | 2264 | 2490 | 2717 | 2943 | 3170 | 3396 |
| 5000 | 1118 | 1398 | 1677 | 1957 | 2236 | 2516 | 2795 | 3075 | 3354 | 3634 | 3913 | 4193 |
| 5500 | 1353 | 1691 | 2029 | 2367 | 2706 | 3044 | 3382 | 3720 | 4058 | 4397 | 4735 | 5073 |
| 6000 | 1610 | 2012 | 2415 | 2817 | 3220 | 3622 | 4025 | 4427 | 4830 | 5232 | 5635 | 6037 |
| 6500 | 1889 | 2362 | 2834 | 3306 | 3779 | 4251 | 4724 | 5196 | 5668 | 6141 | 6613 | 7085 |
| 7000 | 2191 | 2739 | 3287 | 3835 | 4383 | 4930 | 5478 | 6026 | 6574 | 7122 | 7669 | 8217 |
| 7500 | 2516 | 3144 | 3773 | 4402 | 5031 | 5660 | 6289 | 6918 | 7547 | 8175 | 8804 | 9433 |
| 8000 | 2862 | 3578 | 4293 | 5009 | 5724 | 6440 | 7155 | 7871 | 8586 | 9302 | 10017 | 10733 |
| 8500 | 3231 | 4039 | 4847 | 5654 | 6462 | 7270 | 8078 | 8885 | 9693 | 10501 | 11309 | 12116 |
| 9000 | 3622 | 4528 | 5433 | 6339 | 7245 | 8150 | 9056 | 9961 | 10867 | 11773 | 12678 | 13584 |
| 9500 | 4036 | 5045 | 6054 | 7063 | 8072 | 9081 | 10090 | 11099 | 12108 | 13117 | 14126 | 15135 |
| 10000 | 4472 | 5590 | 6708 | 7826 | 8944 | 10062 | 11180 | 12298 | 13416 | 14534 | 15652 | 16770 |
| 10500 | 4930 | 6163 | 7396 | 8628 | 9861 | 11093 | 12326 | 13559 | 14791 | 16024 | 17256 | 18489 |
| 11000 | 5411 | 6764 | 8117 | 9469 | 10822 | 12175 | 13528 | 14881 | 16233 | 17586 | 18939 | 20292 |
| 11500 | 5914 | 7393 | 8871 | 10350 | 11828 | 13307 | 14786 | 16264 | 17743 | 19221 | 20700 | 22178 |
| 12000 | 6440 | 8050 | 9660 | 11269 | 12879 | 14489 | 16099 | 17709 | 19319 | 20929 | 22539 | 24149 |
| 13000 | 7558 | 9447 | 11337 | 13226 | 15115 | 17005 | 18894 | 20784 | 22673 | 24562 | 26452 | 28341 |
| 13500 | 8150 | 10188 | 12225 | 14263 | 16300 | 18338 | 20376 | 22413 | 24451 | 26488 | 28526 | 30563 |
| 14000 | 8765 | 10956 | 13148 | 15339 | 17530 | 19722 | 21913 | 24104 | 26295 | 28487 | 30678 | 32869 |

Figure 4:
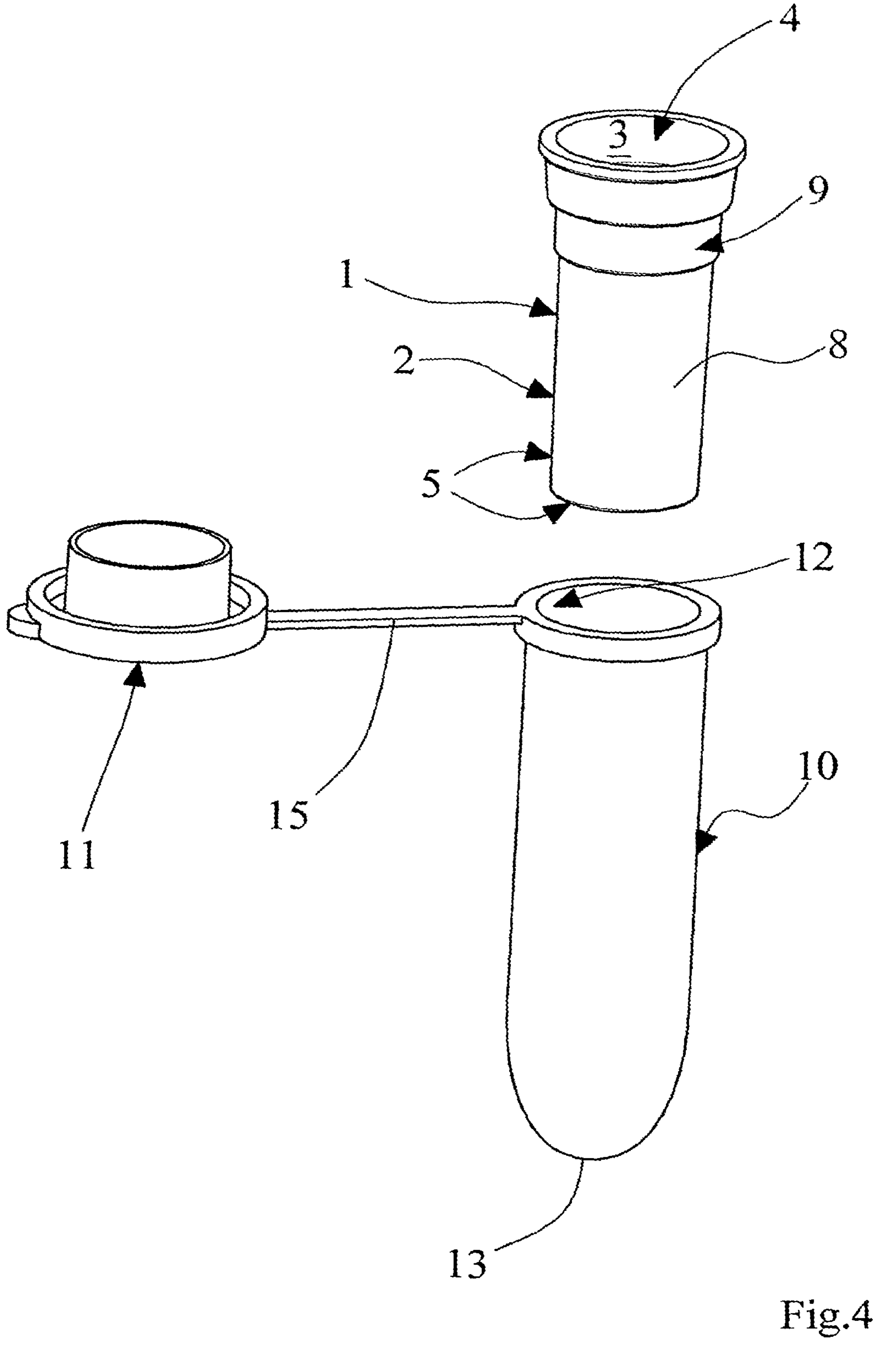
FIG. 4 is a perspective view of the container of FIG. 1 before insertion in a laboratory test tube.
Figure 5:
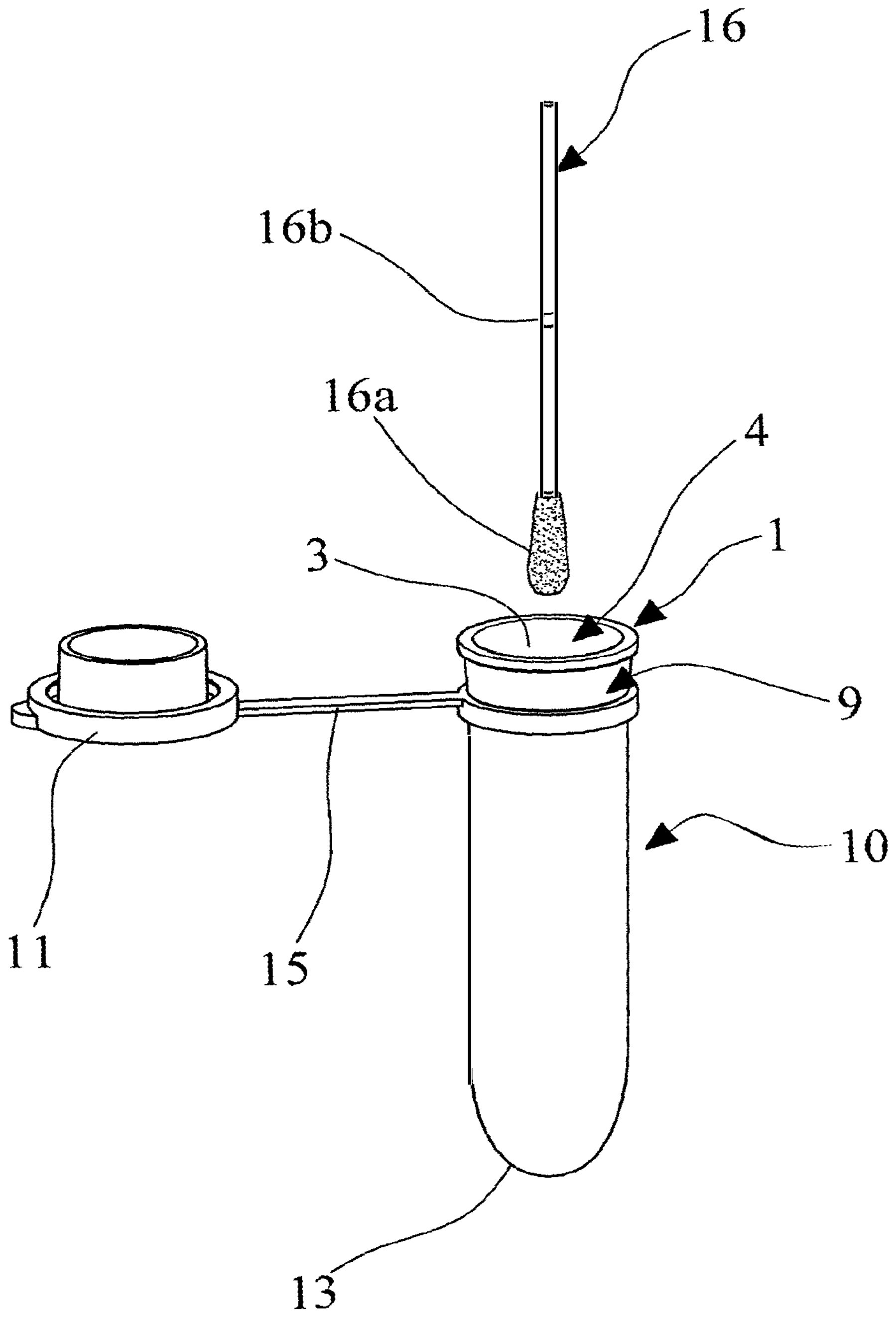
FIG. 5 is a view alike to that of FIG. 4 with the container inserted in the laboratory test tube and a collecting device during the step of insertion into the container.

As illustrated in FIGS. 4-7, the container 1 can be configured such as to be removably insertable in a laboratory test tube 10 and selectively closable by means of a lid 11 of the test tube 10 such as to enable transfer, into the test tube 10, of a fluid or liquid contained in the container 1 by means of mechanical shaking of the test tube 10 in one of the operative passage conditions, for the second predetermined time interval. The lid 11 can be connected to the test tube 10 by means of a connecting portion 15. The body 2 can further comprise a rest portion 9 shaped such as to cooperate with a corresponding support portion 12 of the test tube 10 such as to maintain the container 1 in the test tube 10 in a predetermined position, raised and distanced from the bottom 13 of the test tube 10, as illustrated in FIG. 5. The test tube 10' can be for example a laboratory test tube and/or centrifuge having a capacity comprised between 0,250 ml and 5 ml, or between 0.5 ml and 3 ml, or between 1 ml and 2 ml.

The selective passage portion 6 can be provided with at least a passage opening 14 or a plurality of passage openings, each passage opening being so dimensioned as to prevent the passage of liquid or fluid in the operative sealed condition and in order to enable passage of the liquid or fluid in the operative passage condition. Each opening can exhibit at least a transversal opening dimension which is lower than about 0.2 mm, or about 0.1 mm, or about 0.05 mm, or about 0.02 mm or about 0.01 mm. "Transversal opening dimension" means one of the measured opening dimensions in a plane that is parallel to the containing wall 5 in which the selective passage portion 6 is defined, and thus in a plane that is perpendicular to the development direction of the opening through the thickness of the containing wall 5. As illustrated in FIG. 2, the openings can exhibit a shape that is for example substantially rectangular, with a transversal opening dimension, corresponding to a side of the rectangle much smaller than the other transversal opening dimension, corresponding to the other side of the rectangle. Alternatively, each passage opening 14 can exhibit both the transversal dimensions of opening smaller than about 0.2 mm, or about 0.1 mm, or about 0.05 mm, or about 0.02 mm or about 0.01 mm. The opening can exhibit any shape suitable for the aim.

In an alternative form, not illustrated, each passage opening 14 can be realised by means of a hole with a diameter that is smaller than about 0.2 mm, or about 0.1 mm, or about 0.05 mm, or about 0.02 mm or about 0.01 mm. The dimension of the passage opening 14 is determined such that the surface tension, and therefore the internal cohesion forces, of the liquid or fluid contained in the container 1 are sufficient to maintain the liquid or fluid in the container 1, not allowing passage of the liquid or fluid through the passage openings 14 in the repose conditions or up to application of a determined relative centrifugal force.

Figure 3:
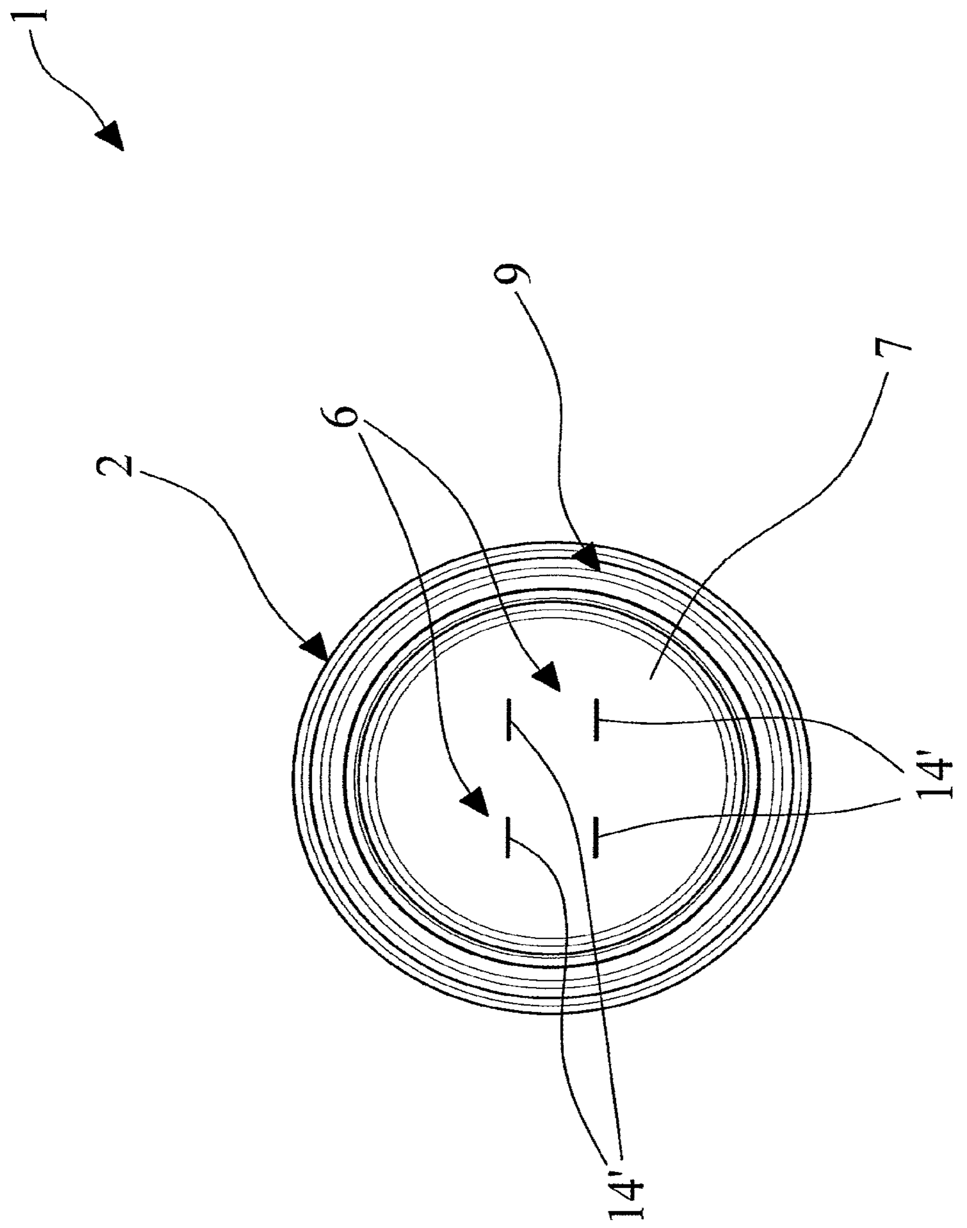
FIG. 3 is a plan view of the bottom of an alternative embodiment of the container of FIG. 1.

Alternatively, in the solution illustrated in FIG. 3, the selective passage portion 6 can be provided with at least a weakened portion 14' or a plurality of weakened portions, each weakened portion 14' being closed or substantially closed at least in one of the operative sealed conditions and/or before the container 1 is brought into one of the operative passage conditions for the second predetermined time interval, and being destined to open in at least one of the operative passage conditions, realising a passage opening 14 suitable for allowing passage of the liquid or fluid across the selective passage portion 6. Each weakened portion 14' can be destined to open in at least one of the operative passage conditions, realising a passage opening 14 having a diameter or at least a transversal opening dimension, or both the transversal opening dimensions, less than about 1 mm, or about 0.5 mm, or about 0.1 mm, or about 0.05 mm, or about 0.02 mm or about 0.01 mm. The weakened portions can be realised by means of discontinuity in the thickness of the body 2 or by means of predetermined reductions in thickness realised on the body 2 or the selective passage portion 6. For example the body 2 can exhibit, at the weakened portions, a smaller thickness than about 0.5 mm and/or 0.1 mm, and/or 0.05 mm and/or 0.02 mm and/or 0.01 mm. As illustrated in FIG. 3, the weakened portions can exhibit a shape which is for example substantially rectangular, with a transversal opening dimension, corresponding to a side of the rectangle, very much smaller than the other opening dimension, corresponding to another side of the rectangle. The weakened portions can exhibit any shape suitable for the aim, and can be for example square, circular etc.

In an alternative embodiment, not illustrated in the accompanying figures, the selective passage portion 6 can be provided with at least an elastically deformable portion or a plurality of elastically deformable portions, each elastically deformable portion being substantially closed at least in one of the sealed operating conditions and/or before the container 1 is brought into one of the operative passage conditions by realising at least a passage opening 14. The selective passage portion 6 can be destined to open by means of elastic deformation at least in one of the operative passage conditions, by realising a passage opening 14 exhibiting a diameter or at least a transversal opening dimension, or both the transversal opening dimensions, smaller than about 2 mm, or about 1 mm, or about 0.5 mm, or about 0.1 mm, or about 0.05 mm, or about 0.02 mm or about 0.01 mm. The selective passage portion 6 can comprise a number from 1 to 30, or from 2 to 15, or from 4 to 8, of the passage openings 14 or the weakened portion or the elastically deformable portions.

The illustrated embodiment of FIG. 2 exhibits four passage openings 14 and the embodiment of FIG. 3 exhibits four weakened portions. In any case, the force or centrifugal acceleration which is applied to the container such as to enable passage of the liquid or fluid across the selective passage portion is selected in such a way as to exceed the surface tension, and the internal cohesion forces of the fluid or liquid contained in the container 1, thus allowing passage of the fluid or liquid across the passage openings 14, either by allowing the opening of the weakened portions 14' and thus the passage of fluid or liquid, or by allowing the opening of the elastically deformable portions and therefore the passage of the fluid or liquid.

The body 2 can be made of a plastic material, for example made of polypropylene or virgin polypropylene, or in any other material suitable for the aim, and can be realised by injection. The weakened portions and/or the openings can be realised on the body 2 in the same injection operation that the body 2 of the container 1 is made in, by suitable punches which enable the passage openings 14 and/or the weakened portions and/or the elastically deformable portions to be realised.

Figure 6:
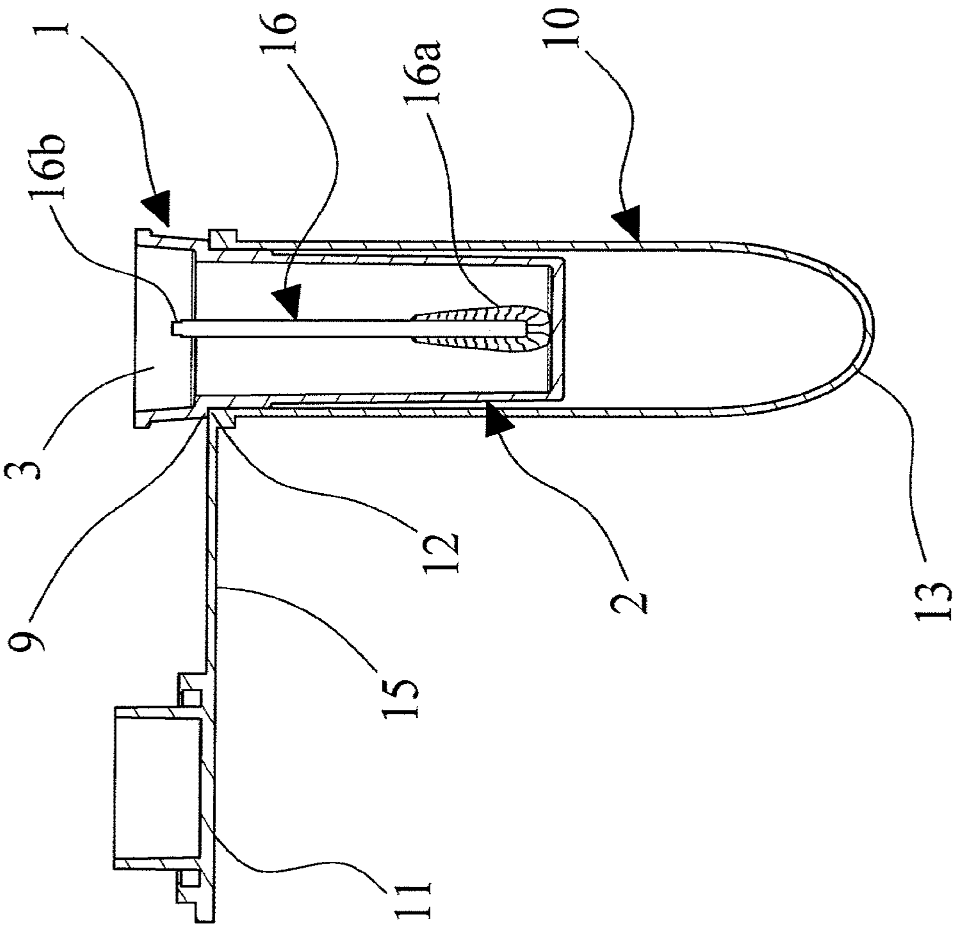
FIG. 6 is a section view made along a median plane of the elements of FIG. 5 in which a portion of the collecting device is inserted in the container.
Figure 7:
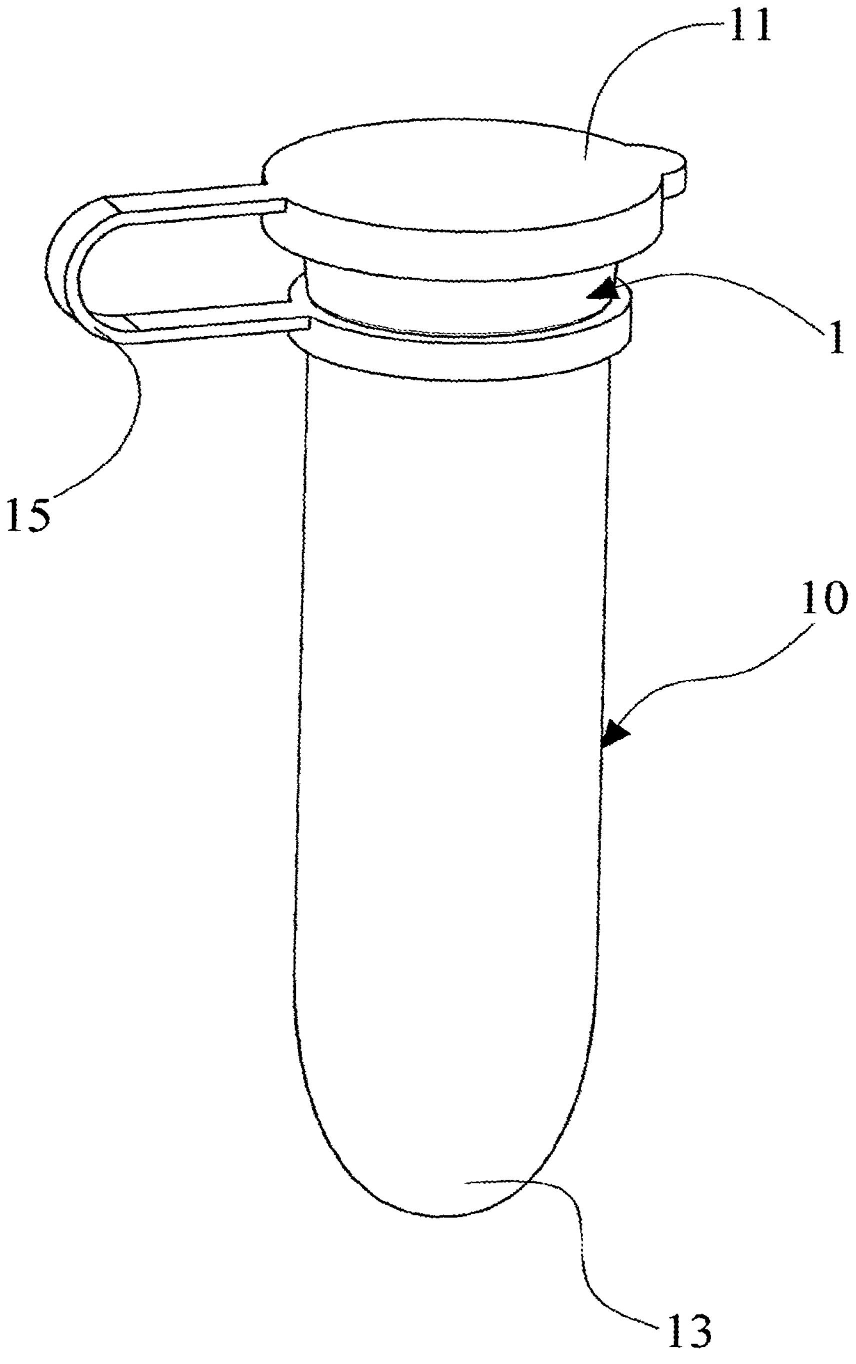
FIG. 7 is a like view to that of FIG. 4, with the container inserted in the laboratory test tube and closed by a lid of the test tube.

The present invention further relates to a kit for selective transfer of samples of biological material or material of biological origin, comprising a laboratory test tube 10 selectively closable by means of a lid 11 and further comprising a container 1 of the above-described type and selectively insertable and closable in the test tube 10 by means of the lid 11, as illustrated in FIGS. 4-6.

The invention further relates to the use of a container 1 of the above-described type for selective transfer of samples of biological material or material of biological origin from the container 1 to a test tube 10 in which the container 1 is inserted, by means of mechanical shaking of the test tube 10 greater than a predetermined mechanical shaking and/or by means of application of a relative centrifugal force that is greater than a predetermined relative centrifugal force to the test tube 10.

The invention further relates to a process for selective transfer of samples of biological material or material of biological origin, which can comprise steps of: inserting a portion 16*a* of a sample device 16 for biological samples, for example the collecting portion of a flocked tampon, in the container 1; inserting a lysing fluid or liquid into the container 1; subjecting the container 1 comprising the portion 16*a* of a collecting device 16 and the lysing fluid or liquid to heat incubation, at a predetermined temperature and for a predetermined time.

The process can further comprise the step of breaking the collecting device 16 at a weakened portion 16*b* thereof in order to insert only the collecting portion 16*a* in the container 1. The process can further comprise steps of inserting the container 1 in the laboratory test tube 10; closing the container 1 in the test tube 10 by means of the lid 11; mechanically shaking the test tube 10 containing the container 1, for example by positioning the test tube 10 in a laboratory centrifuge, at a greater level than a predetermined mechanical shaking, or subjecting the test tube 10 to a relative centrifugal force that is greater than a relative predetermined centrifugal force, for the second predetermined time interval, such as to cause passage of at least a part of the fluid or liquid from the container 1 to the test tube 10 across the selective passage portion 6.

The process can further comprise the steps of removing the container 1 from the test tube 10 after the step of mechanically shaking the test tube 10 containing the container 1. The step of mechanically shaking the test tube 10 containing the container 1, or subjecting the test tube 10 to a relative centrifugal force, can be performed at a relative angular velocity and for a time that are sufficient to cause passage of at least 80%, or at least 90% or at least 95% of the fluid or liquid from the container 1 to the 10.

The present invention enables attainment of at least one of the above-cited aims. The invention enables realising a container able to obviate one or more of the problems encountered in the prior art. Further, a container according to the invention enables significant reduction of the risks of contamination of the biological sample treated, as it eliminates a step of further handling of the portion of the collecting device. Further, the invention enables simplification of the extraction of the biological sample from the collecting device and reducing the time necessary for the performing of this operation. It is further of note that the invention enables recuperating the test tube, substantially completely, all of the biological sample initially collected by the collecting device. The invention is further simple and economical to realise and easy to use.

The invention claimed is:

1. A container for selective transport of samples of biological material or of biological origin comprising a body having at least a compartment suitable for containing at least a fluid or liquid and/or for containing at least a portion of a collecting device for biological samples, the body comprising at least an access opening to the compartment, and at least a containing wall provided with at least a selective passage portion provided with at least a weakened portion or a plurality of weakened portions monolithic with the body, wherein the selective passage portion is configured such as to prevent exit of a fluid or liquid from the container, through the passage portion at least in an operating sealed condition in which the container is in a rest state or is subjected to a first value of mechanical shaking and/or is subjected to a first value of relative centrifugal force for a first predetermined time interval, and wherein the selective passage portion is further configured such as selectively to enable exit of the fluid or liquid from the container, across the passage portion, at least in an operating passage condition, in which the container is subjected to a corresponding second state of mechanical shaking and/or is subjected to a corresponding second relative centrifugal force, for a second predetermined time interval.

2. The container of claim 1, wherein the selective passage portion is configured such as to prevent exit of the fluid or liquid from the container at a plurality of the sealed operating conditions, applied for a first predetermined time interval of shaking and in which the container is subjected to a plurality of respective first values of mechanical shaking which plurality of values is lower than a predetermined state of mechanical shaking of the container and/or in which the container is subjected to a plurality of respective first values of relative centrifugal force which first values are lower than a relative predetermined value of centrifugal force and/or wherein the portion of selective passage is configured such as to selectively enable outlet of the fluid or liquid from the container through the passage portion, at a plurality of the operating passage conditions, applied for a second predetermined time interval of shaking and in which the container is subjected to a plurality of second respective values of mechanical shaking that are greater than the predetermined state of mechanical shaking and/or in which the container is subjected to a plurality of respective second relative values of centrifugal force greater than the relative predetermined value of centrifugal force.

3. The container of claim 1, wherein the selective passage portion is configured such as to prevent exit of the fluid or liquid from the container through the selective passage portion at least in a sealed operating condition in which the container is subjected to a relative centrifugal acceleration or relative centrifugal force (RCF) that is lower than 500×g, or lower than 1000×g, or lower than 2000×g, or lower than 3000×g, or lower than 4000×g, or lower than 5000×g, for a first predetermined time interval of shaking and/or in which the selective passage portion is configured such as to selectively enable exit of the fluid or liquid from the container through the selective passage portion in an operative passage condition in which the container is subjected to a relative centrifugal acceleration or relative centrifugal force (RCF) of at least 500×g, or at least 1000×g, or at least 2500×g, or at least 5000×g, or at least 7500×g, or at least 10000×g for a second predetermined time interval of shaking.

4. The container of claim 1, wherein the selective passage portion is provided with at least a passage opening or a plurality of passage openings, each opening being so dimensioned as to prevent passage of the liquid or fluid in the operative sealed condition and in order to enable passage of the liquid or fluid in the operating passage condition and/or each opening having at least a transversal opening dimension of less than about 0.2 mm, or than about 0.1 mm, or than about 0.05 mm, or than about 0.02 mm or than about 0.01 mm, or wherein each passage opening exhibits both transversal dimensions with opening of less than about 0.2 mm, or than about 0.1 mm, or than about 0.05 mm, or than about 0.02 mm or than about 0.01 mm, or wherein each passage opening is a hole with a diameter of less than about 0.2 mm, or than about 0.1 mm, or than about 0.05 mm, or than about 0.02 mm or than about 0.01 mm.

5. The container of claim 1, wherein the selective passage portion is provided with at least a weakened portion or a plurality of weakened portions, each weakened portion being closed or substantially closed at least in one of the sealed operating conditions and/or before the container is brought into one of the operating passage conditions for the second predetermined time interval, and being suitable for opening in at least one of the operating passage conditions by realising a passage opening suitable for enabling passage of the liquid or fluid through the selective passage portion and/or being destined to open in at least one of the operating passage conditions, realising a passage opening having a diameter or at least a transversal opening dimension, or both the transversal opening dimensions, of less than about 1 mm, or less than about 0.5 mm, or less than about 0.1 mm, or less than about 0.05 mm, or less than about 0.02 mm or less than about 0.01 mm and/or wherein the weakened portions are realised by discontinuities in the thickness of the body or by predetermined reductions of thickness realised on the body in the selective passage portion, and/or wherein the body exhibits, at the weakened portions, a thickness of less than about 0.5 mm or less than 0.2 mm or less than 0.1 mm, or less than 0.05 mm or less than 0.02 mm or less than 0.01 mm.

6. The container of claim 5, wherein the number of weakened portions ranges from 1 to 30.

7. The container of claim 1, wherein the selective passage portion is provided with at least an elastically deformable portion or a plurality of elastically deformable portions, each elastically deformable portion being substantially closed at least in one of the sealed operating conditions and/or before the container is brought into one of the operating passage conditions for the predetermined time, and being destined to open by elastic deformation in one of the operating passage conditions by realising at least a passage opening, and/or wherein it is destined to open by elastic deformation at least in one of the operating passage conditions by realising at least a passage opening exhibiting a diameter or at least a transversal opening dimension, or both transversal opening dimensions, of less than about 2 mm, or less than about 1 mm, or less than about 0.5 mm, or less than about 0.1 mm, or less than about 0.05 mm, or less than about 0.02 mm or less than about 0.01 mm.

8. The container of claim 1, wherein the selective passage portion comprises a number of passage openings or of weakened portions ranging from 1 to 30.

9. A kit for selective transfer of samples of biological material or material of biological origin, comprising a laboratory test-tube selectively closable by a lid and further comprising a container according to claim 1 and selectively insertable and closable in the test-tube by the lid, wherein the body of the container further comprises a rest portion profiled such as to cooperate with a corresponding support portion of the test tube such as to maintain the container in the test tube in a predetermined position, raised and distanced from the bottom of the test tube and/or wherein the container is configured such as to be removably insertable in a laboratory test tube and selectively closable in the test tube such as to enable transfer into the test tube of a fluid or liquid contained in the container by mechanical shaking of the test tube in one of the operative passage conditions for the second predetermined time interval.

10. A method for using the container constructed according to claim 1 for selective transfer of samples or biological material or materials of biological origin to a test tube in which the container is inserted, the method comprising:

mechanically shaking the test tube greater than a predetermined mechanical shaking and/or applying a relative centrifugal force that is greater than a predetermined relative centrifugal force on the test tube.

11. A process for selective transfer of samples of biological material or material of biological origin comprising steps of:

inserting the container according to claim 1 in a laboratory test tube;

closing the container in the test tube; and mechanically shaking the test tube containing the container to a level that is greater than a predetermined mechanical shaking, or subjecting the test tube to a relative centrifugal force that is greater than a predetermined relative centrifugal force, for the second predetermined time interval, such as to cause passage of at least a part of the fluid or liquid from the container to the test tube through the selective passage portion.

12. A method for using the container of claim 1, the method comprising:

inserting said container in a test tube;

selectively transferring samples of biological material contained in said container to said test tube;

applying to the test tube, and to the container inserted in said test tube, at least a predetermined mechanical shaking and/or at least a predetermined relative centrifugal force.

13. A process for selective transfer of samples of biological material or material of biological origin contained in the container according to claim 1, the process comprising the steps of:

inserting said container in a laboratory test tube;

closing the container in the test tube;

mechanically shaking the test tube and the container to a level that is greater than a predetermined mechanical shaking, or subjecting the test tube and said container to a relative centrifugal force that is greater than a predetermined relative centrifugal force, for the second predetermined time interval, such as to cause passage of at least a part of the fluid or liquid from the container to the test tube through the selective passage portion.

* * * * *